United States Patent [19]

Maas et al.

[11] Patent Number: 5,317,544
[45] Date of Patent: May 31, 1994

[54] MULTIPLE SEGMENT FIBER OPTIC HYDROPHONE

[75] Inventors: Steven J. Maas, Simi Valley; A. Douglas Meyer, West Hills, both of Calif.

[73] Assignee: Litton Systems, Inc., Beverly Hills, Calif.

[21] Appl. No.: 973,421

[22] Filed: Nov. 9, 1992

[51] Int. Cl.⁵ .............................................. H04R 23/00
[52] U.S. Cl. ................................. 367/149; 250/227.19
[58] Field of Search .................. 367/149, 140; 385/12; 356/345; 250/227.19, 227.17, 227.16, 227.11, 227.27; 73/653, 655

[56] References Cited

U.S. PATENT DOCUMENTS

| | | | |
|---|---|---|---|
| 4,193,130 | 3/1980 | Young et al. | 367/149 |
| 5,140,154 | 8/1992 | Yurck et al. | 250/227.12 |
| 5,155,548 | 11/1992 | Danver et al. | 356/345 |
| 5,212,670 | 5/1993 | Brown | 367/149 |

*Primary Examiner*—Ian J. Lobo
*Attorney, Agent, or Firm*—Elliott N. Kramsky

[57] ABSTRACT

A hydrophone includes a plurality of hydrophone components separated by finite spacings and interconnected to provide a single output signal. Each hydrophone component is based upon a single-mandrel design in which a cylindrical body is apportioned into sensing and reference sections. The sensing sections comprise coaxial arrangements of pliant inner and outer cylinders separated by an annular airspace while the adjacent reference sections comprise solid-walled cylinders. Finite separation distances between the hydrophone components result in reduced flow noise occasioned by increased sensing area while detection sensitivity is maintained.

20 Claims, 3 Drawing Sheets

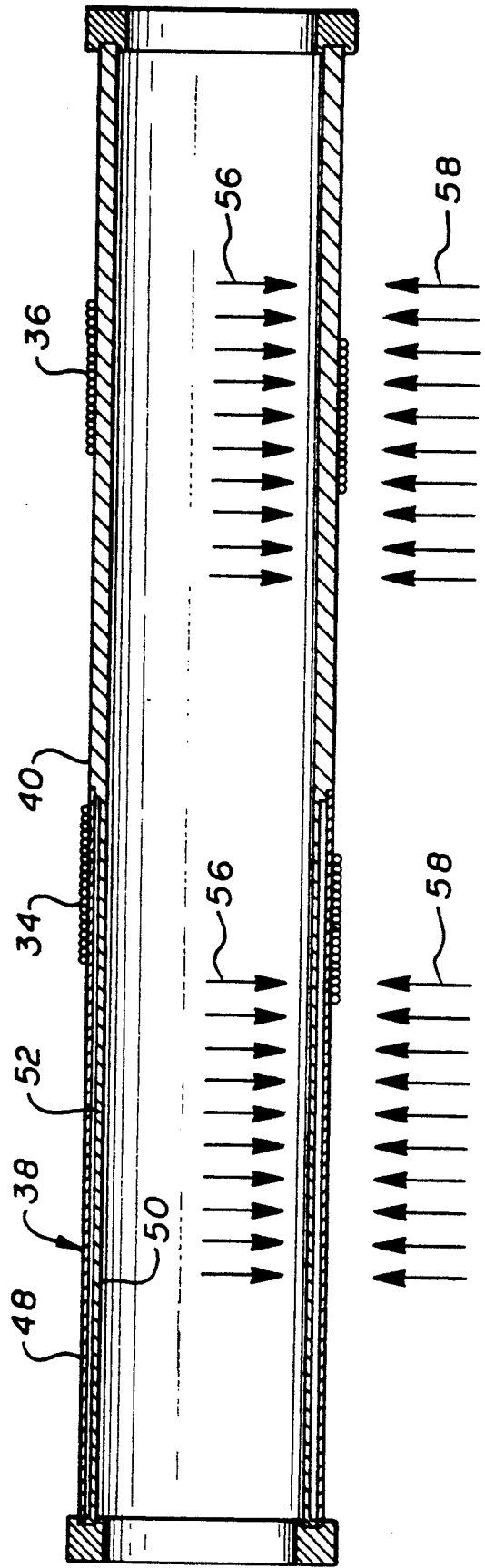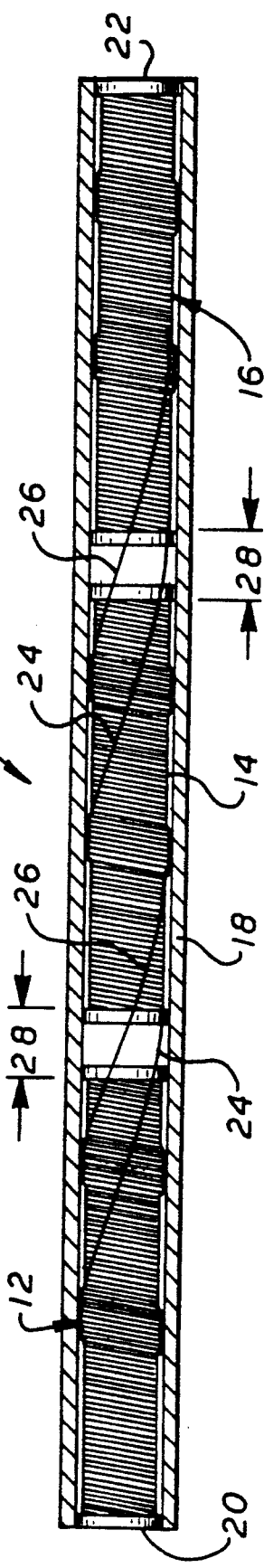

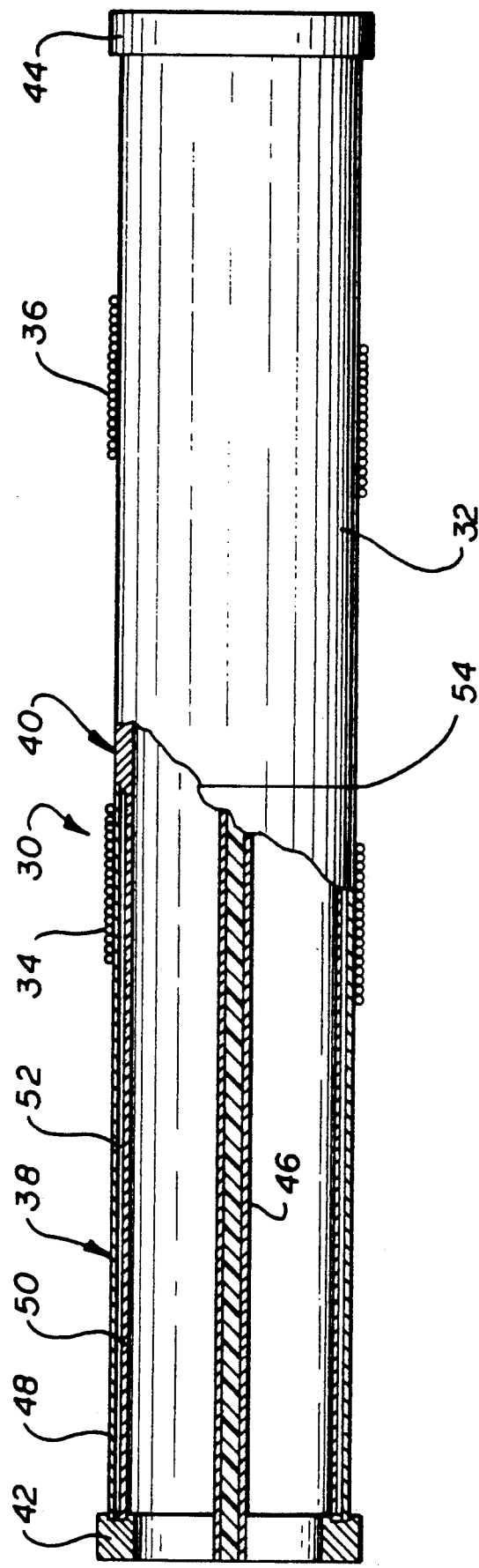
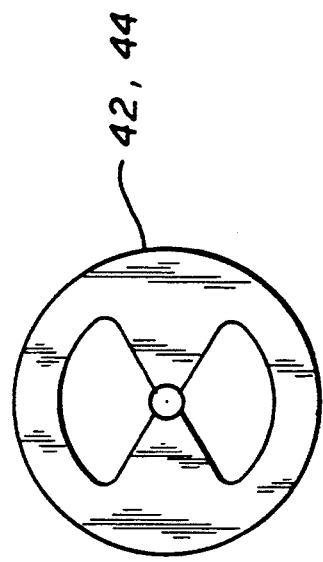
FIG. 2(a)
FIG. 2(b)

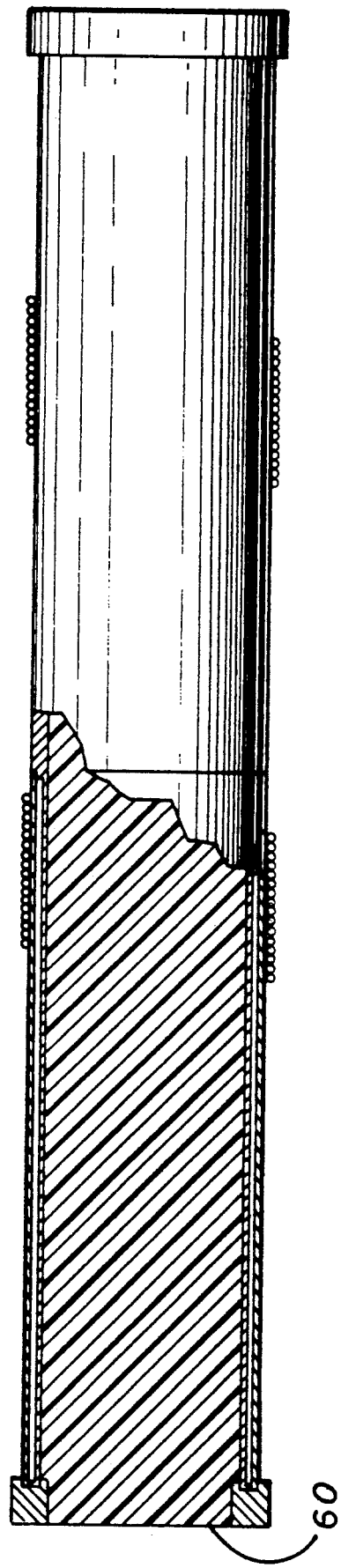
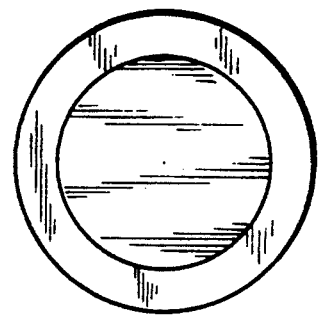
FIG. 4(a)
FIG. 4(b)

MULTIPLE SEGMENT FIBER OPTIC HYDROPHONE

BACKGROUND

1. Field of the Invention

The present invention relates to fiber optic hydrophones. More particularly, this invention pertains to a hydrophone formed in multiple segments.

2. Description of the Prior Art

SONAR-based systems for detecting underwater hazards and threats employ pressure-actuated transducers of the hydrophone type to generate signals indicative of the presence and location of underwater objects. In an active system, such objects are "illuminated" by the reflection of acoustic wavefronts that are initially transmitted from a ship or other source in the water. The acoustic signals, when reflected, provide phase shift information that, when processed, enables one to ascertain underwater position. In a passive system, noise that is radiated from a target is detected.

In use, a SONAR system utilizes a predetermined submergeable arrangement of acoustic hydrophones to collect a spatial distribution of "echo" data that can be analyzed for information such as position and closing rate.

The array is housed within a hose-like element that is fixed to the end of a towing cable that comprises an arrangement of optical fibers and/or electrical conductors located within a protective outer jacket. An example of such a cable is disclosed in U.S. patent Ser. No. 4,952,012 of Stamnitz entitled "Electro-Opto-Mechanical Cable For Fiber Optic Transmission Systems."

The processing of data from an array is well-known and discussed, for example, by A. Dandridge et al. in the article "Multiplexing of Interferometric Sensors Using Phase Carrier Techniques," *Journal of Lightwave Technology*, Vol. LT-5, No. 7 (July 1987) at pages 947–952.

While the towed array is a well accepted and recognized element of a SONAR system, its realization and practice is fraught with a number of serious mechanical difficulties. Some of such problems are related to deployment of the array while others pertain to the maintenance of reliable optical and/or electrical contact between it and the SONAR-equipped ship. The prior art discloses fiber optic hydrophones of various sizes and shapes. For example, hydrophones for towed arrays have been manufactured by the Assignee herein having a diameter of one inch and a length of six inches and having a diameter of 0.5 inches and a length of three inches. Both of such units comprise rigid body constructions and are representative of the majority of fiber optic sensor designs of which the inventors are aware.

In use, a hydrophone array is generally stored and played out from a winch aboard a transporting ship. In deployment, the array and cable may also traverse various capstans, pulleys and other sheave-like devices for guiding the cable over the ship's deck. While hydrophones having lengths as above-described are quite suitable when used in an environment where winches and sheaves possess radii of greater than twenty (20) inches, the rigid sensing elements are not suitable for use in an environment where very small radius ($\approx 2$ inches) sheaves and winches are encountered. When an array of three (3) or six (6) inch sensors is spooled over a two inch radius winch, it is obvious that stresses will be produced in both the hydrophones and the array's encapsulating hose that can degrade performance and possibly cause the failure of both. For example, the rigid hydrophone may become bent during storage or the array's hose-like housing may be punctured.

SUMMARY OF THE INVENTION

The present invention addresses the foregoing and other shortcomings of the prior art by providing, in a first aspect, a hydrophone formed from a plurality of hydrophone components. Means are provided for compliantly connecting adjacent hydrophone components. Each of the hydrophone components includes a mandrel comprising an integral, substantially-cylindrical body that is apportioned into axially-disposed sending reference sections. The hydrophone components are coaxially aligned with a finite separation distance between adjacent components and optically interconnected so that acoustic pressure-responsive signals generated by each are combined to form a single hydrophone output.

In another aspect, the invention provides a hydrophone that comprises an integral, cylindrical mandrel including axially-disposed sensing and reference sections. A first optical fiber is wound around the sensing section and a second optical fiber is wound about the reference section. An interferometer is provided for receiving the signals transmitted by the first and second optical fibers.

The preceding and other features and advantages of this invention will become further apparent from the detailed description that follows. Such description is accompanied by a set of drawing figures. Numerals of the drawing figures, corresponding to those of the written description, point to the various features of the invention. Like numerals refer to like features throughout both the written description and the drawing figures.

BRIEF DESCRIPTION OF THE DRAWINGS

FIG. 1 is a side sectional view of a segmented hydrophone system in accordance with the invention;

FIGS. 2(a) and 2(b) are a partial side sectional view and an end view respectively of a single mandrel element for use in a multi-element hydrophone in accordance with the invention;

FIG. 3 is a simplified side sectional view of a mandrel element of the invention for illustrating the mode of operation thereof; and FIGS. 4(a) and 4(b) are side sectional and end views respectively of a hydrophone in accordance with an alternative embodiment thereof.

DETAILED DESCRIPTION

FIG. 1 is a side-sectional view of a segmented hydrophone 10 in accordance with the invention. The segmented hydrophone comprises three substantially-identical component hydrophone segments 12, 14, and 16 that are aligned within sleeve-like tubing 18 of TYGON or like material. Alternatively, a flexible coupling might be provided in place of the sleeve-like tubing 18. Such flexible interconnect or coupling between the hydrophone elements may comprise, for example, compliant bushings, ball and socket joints or universal joints. Each of such means will provide the hydrophone sufficient flexibility.

Each of the hydrophone segments is of a novel "single mandrel" type discussed in greater detailed below.

Employing multiple hydrophone segments an acoustic wave sensing fiber 24 and a reference fiber 26 are consecutively wound about the outer circumferences of each of the hydrophone segments 12, 14 and 16. The interior of the tubing 18 is allowed to be flooded with an appropriate fill fluid such as ISOPAR-L or SHELL-SOL 71.

By utilizing a segmented design, the hydrophone 10 overcomes the problems discussed earlier related to the relative sizes of rigid hydrophone mandrels and radii of curvature encountered in a deploying vessel. For example, each of the component hydrophone segments 12, 14 and 16 may have a length of one inch as opposed to the conventional three or six inch length of an existing standard sized mandrel. In addition, a finite separation distance 28 exists between adjacent mandrels. This increases the effective overall length of the hydrophone 10 to exceed the sum of the lengths of the mandrels of the three segments 12, 14 and 16. This enhances the acoustic performance of the sensor by extending the sensing surface area. The increase, allowing array flow noise to be integrated over a greater area, reduces the effective flow noise contribution seen by the hydrophone. For example, while a three inch long sensor has the same sensitivity as three one inch segmented sensors, the flow noise encountered by a segmented sensor design (4 inch total length) would be 1.25 dB less than that measured by a three inch mandrel. While the invention is disclosed with reference to a hydrophone 10 comprising three one inch long hydrophone segments, the teachings of this invention may be directly extended to segmented hydrophone designs employing differing numbers and differing sizes of hydrophone segments.

As mentioned earlier, the segmented hydrophone 10 comprises a plurality of hydrophone segments 12, 14 and 16, each of which features a unique single mandrel design. The details, variations and advantages of such a novel hydrophone design will be discussed with reference to succeeding figures. Prior to such discussion, however, it should be kept in mind that, as shown in FIG. 1, the reference sections of each hydrophone segment are wound in series with a single continuous optical fiber 26 while the sensing sections are wound in series with a single continuous optical fiber 24. For this reason, the signals applied to the pressure measuring interferometer will receive sensing and reference signals that represent signal sums gathered from the three hydrophone segments 12, 14 and 16. Accordingly, the interferometer of the hydrophone operates upon averaged values in evaluating acoustic information.

FIG. 2(a) is a partial side sectional view of a novel fiber optic hydrophone of the type employed as a component hydrophone segment of the hydrophone 10 of the invention. As already discussed, by "dividing" the hydrophone into identical segments and then wiring them together in such a way that the optical signals generated therein are additive, the resulting hydrophone, or an array thereof, may be readily deployed from various platforms where small radii, both of winches and other sheaves, are encountered by the hose containing the hydrophone(s). As discussed, in addition to facilitating hydrophone use in such environments, the overall system comprising a plurality of hydrophone segments actually attains a performance level that exceeds that possible with a hydrophone having a unitary mandrel whose length equals the sum of the lengths of the hydrophone segment mandrels. This is due to the extension of sensing area that results from the inclusion of inter-segment spacings.

The hydrophone of FIG. 2(a) requires a minimum number of parts and fabrication steps. Further, as will be seen, by employing a single body for use as both the sensing and the reference mandrel, the device presents a relatively-small cross-sectional area that will not unnecessarily restrict the free flow of fill fluid in towed array applications. As a result, the array's self noise is minimized and the buoyancy problems sometimes encountered in towed array applications are reduced.

Referring back to FIG. 2(a), the hydrophone or hydrophone segment 30 is characterized by a single, substantially continuous cylindrical body 32 that serves as both the sensing and the reference mandrel. That is, both the optical fiber 34 that carries the acoustic pressure sensing signal and the fiber 36 that carries the reference signal for application to an associated pressure-detecting interferometer are wound about the continuous circumferential surface of a single cylindrical body 32 that is divided into distinct sensing and reference sections. Referring back to FIG. 1, when employed as a unit of the segmented hydrophone, the continuous optical fiber 34 is wound serially about the sensing sections of the hydrophone segments while the fiber 36 is serially wound about the reference sections.

The sensor section 38 and the reference section 40 that make up the cylindrical body 32 are of equal axial lengths. The ends of the body 32 terminate in end caps 42 and 44. One end cap configuration is shown in FIG. 2(b), an end view of the body 32. As can be seen, the end cap includes apertures that permit the passage and free circulation of fill fluid throughout the hydrophone 30. A coupler splice tube 46 (optional) having an outside diameter of, for example, less than 0.20 inches, may be positioned within the body 32 for supporting, for example, a 3 dB fiber optic coupler and the associated mirrors that comprise the interferometer for forming the output signal. Normally a Michelson interferometer is formed using one coupler but a Mach-Zehnder interferometer, requiring two couplers, may also be employed. In the event that a Michelson interferometer is utilized, the fiber ends are terminated with mirrors and the mirror ends, along with the optical coupler, are fixed by an appropriate adhesive, such as EPOXY, and placed inside the tube 46. In the event that the hydrophone 30 is employed as an element of a flexible, multi-segmented hydrophone system, a single interferometer is required that is positioned within a predetermined one of the hydrophone segments. The wiring pattern of the associated optical fibers will suggest the optimum mandrel for placement or inclusion of the interferometer's optical components. An optional protective cage, secured in place by the end caps 42 and 44, may be arranged to surround the sensor device. Such a cage, generally comprising a hollow cylinder with a plurality of apertures, protects the hydrophone 30 when exposed to a fluid environment without materially degrading instrument sensitivity. The hydrophone segment is composed of a thin wall mandrel 48 and a body 50. The body 50 provides a foundation for the sensor.

The reference section 40 comprises a solid-walled, hollow cylinder. This section generates the signal for application to the reference arm of the interferometer while the compliant sensor section 38 comprises a thin-walled cylinder 48, that has been slid into position over the body 50 and is separated therefrom by an annular airspace 52. The wall thicknesses of the cylinder 48 is typically less than 0.05 inch. The thin-walled sensing mandrel 48 and the body section 50 are fastened at a joint 54 by means of an appropriate adhesive to form the single mandrel cylindrical body 32 that characterizes the novel hydrophone 30.

FIG. 3 is a cross-sectional view of the hydrophone segment 30 of the preceding figures for illustrating its mode of operation. The sensing section 38 may be thought of as the "cavity backed" portion of the unitary mandrel while the reference section 40 may be thought of as non-cavity backed. This reflects the fact that the outer thin-walled cylinder 48 sits atop an annular airspace 52. The windings of the sensing optical fiber 34 surround and are responsive solely to deflections of the outer surface of the sensing section 38 as the annular airspace 52 acts to isolate the inner wall of the body 50 therefrom. This is entirely unlike the situation that exists at the reference segment 40 of the mandrel. Since the section 40 comprises a solid-walled cylindrical body, acoustic pressure (in the form of wave pressure transmitted by the fill fluid contained within the tubing 18 and represented by the oppositely-directed wavefronts 56 and 58) can produce no net deformation of the circumference of the reference section 40. Counteracting wavefronts 56 and 58 are generated by the incidence of acoustic pressure upon the tubing 18. This follows from the incompressibility of the fill fluid and system equilibrium conditions.

In contrast, inwardly acting wave pressure 58 is not offset by outwardly acting wave pressure 56 at the sensing section 38. This results from the isolation of the inner cylinder of the body 50 from the outer cylindrical member 48 by the intervening annular airspace 52. While the outwardly-acting pressure 56 may cause some expansion of the circumference of the complaint inner cylindrical member 50 at the same time that the inwardly acting pressure 58 compresses the outer member 48, the two actions do not offset one another as occurs at the reference section 40. Thus, each of the sections 38 and 40 is properly reactive (and non-reactive) to the incidence of wave pressure for providing the requisite inputs to an optical measurement device such as an interferometer.

The unitary cylindrical body mandrel construction, in addition to providing the advantages of simplified structure and slim design, realizes advantages in terms of performance. The smaller outer dimension of the device reduces the overall noise performance of an array and allows the fabrication of thinner towed arrays. By providing only a single cylindrical member, free flow of fill fluid through the central aperture of the hydrophone can occur, reducing the amount of hose blockage and lowering flow noise. Additionally, since both the sensing and reference fibers are wound on a common cylindrical mandrel, both will respond similarly to the thermal environment, limiting thermal bias effects.

The sensor can be fabricated of either ferrous of nonferrous metals, plastics or ceramics without loss in terms of general function. Material selection is greatly dependent upon the specific application. However, for the most part, aluminum alloys are advantageous due to their high weight to strength ratio, machinability and other physical properties.

The acoustic sensitivity of the hydrophone is determined by the wall thickness of the sensing section. The dimensions of the cavity formed by the annular airspace determines the operational bandwidth of the device. Thus, the dimensions of the sensor should be determined by the highest frequency one wishes to detect.

An alternative embodiment of the novel hydrophone is shown in FIGS. 4(a) and 4(b). As can be seen in these figures, the hydrophone of FIGS. 4(a) and 4(b) differs from that of the prior embodiment insofar as the mandrel is filled with an appropriate potting compound 60. As can be seen in FIG. 4(b), an end view of the hydrophone, the end caps in this embodiment are ring-like and need not provide for an internal flow of fill fluid.

Thus it is seen that the present invention provides a hydrophone that includes a plurality of hydrophone segments of the single-mandrel type. By utilizing the teachings of this invention, one can achieve a hydrophone that is suitable for deployment from numerous types of vessel platforms that were formerly unavailable due to the small radii characteristic of the launch areas provided by such vessels. Accordingly, the teachings of this invention have expanded the range of uses of hydrophones for towed SONAR, minisubmarines and like devices.

While this invention has been described with reference to its presently preferred embodiment, it is not limited thereto. Rather, this invention is limited only insofar as defined by the following set of patent claims and includes within its scope all equivalents thereof.

What is claimed is:

1. A hydrophone comprising, in combination:
   a) a plurality of hydrophone components;
   b) means for compliantly connecting adjacent hydrophone components;
   c) each of said hydrophone components including a mandrel comprising an integral, substantially-cylindrical body that is apportioned into axially-disposed sensing and reference sections;
   d) said hydrophone components being coaxially aligned with a finite separation distance between adjacent components and optically interconnected so that acoustic pressure-responsive signals generated by each are combined to form a single hydrophone output.

2. A hydrophone as defined in claim 1 further including:
   a) a first optical fiber wound about and interconnecting said sensing sections of said hydrophone components;
   b) a second optical fiber wound about and interconnecting said reference sections of said hydrophone components; and
   c) an interferometer for receiving the signals transmitted by said first and second optical fibers.

3. A hydrophone as defined in claim 2 further characterized in that:
   a) each of said sensing sections comprises an inner cylindrical member and an outer cylindrical member separated by an annular airspace; and
   b) said reference section comprises a solid-walled cylindrical member.

4. A hydrophone as defined in claim 3 further characterized in that:
   a) said sensing sections and said reference sections are of equal axial lengths;
   b) equal windings of said first and second optical fibers are wound about said sensing and reference sections.

5. A hydrophone as defined in claim 4 further including:
   a) a pair of end caps; and b) said caps terminate the opposed ends of each of said hydrophone components.

6. A hydrophone as defined in claim 5 wherein said means for compliantly connecting includes a flexible tube for enclosing said hydrophone components.

7. A hydrophone as defined in claim 6 wherein said hydrophone components are additionally characterized in that:
   a) said mandrels are substantially hollow;
   b) said end caps have apertures therein; and
   c) said flexible tube is substantially filled with a preselected fill fluid.

8. A hydrophone as defined in claim 7 further including:
   a) a coupler splice tube;
   b) said coupler splice tube is located within at least one of said hydrophone components; and
   c) said coupler splice tube contains an interferometer.

9. A hydrophone as defined in claim 8 when said interferometer is of the Mach-Zehnder type.

10. A hydrophone as defined in claim 8 wherein said interferometer is of the Michelson type.

11. A hydrophone as defined in claim 5 wherein at least one of said hydrophone components is substantially filled with a potting compound.

12. A hydrophone comprising, in combination;
   a) an integral, cylindrical mandrel including axially-disposed sensing and reference sections;
   b) a first optical fiber being wound about said sensing section;
   c) a second optical fiber being wound about said reference section; and
   d) an interferometer for receiving the signals transmitted by said first and second optical fibers.

13. A hydrophone as defined in claim 12 further characterized in that:
   a) said sensing section comprises an inner cylindrical member and an outer cylindrical member separated by an annular airspace; and
   b) said reference section comprises a solid-walled cylindrical member.

14. A hydrophone as defined in claim 13 further characterized in that:
   a) said sensing section and said reference section are of equal axial lengths;
   b) equal windings of said first and second optical fibers are wound about said sensing and reference sections.

15. A hydrophone as defined in claim 14 further including:
   a) a pair of end caps; and
   b) said caps terminate the opposed ends of said hydrophone.

16. A hydrophone as defined in claim 15 additionally characterized in that:
   a) said mandrel is substantially hollow; and
   b) said end caps have apertures therein.

17. A hydrophone as defined in claim 16 further including:
   a) a coupler splice tube;
   b) said coupler splice tube is located within said hydrophone; and
   c) said coupler splice tube contains an interferometer.

18. A hydrophone as defined in claim 17 wherein said interferometer is of the Mach-Zehnder type.

19. A hydrophone as defined in claim 17 wherein said interferometer is of the Michelson type.

20. A hydrophone as defined in claim 15 wherein said mandrel is substantially filled with a potting compound.

* * * * *